United States Patent
Cichy et al.

(10) Patent No.: US 12,314,745 B1
(45) Date of Patent: May 27, 2025

(54) TECHNOLOGIES FOR ENABLING RULE ENGINES TO GUIDE USERS IN COMPLETING TRANSACTIONS BASED ON ENGAGING WITH LANGUAGE MODELS

(71) Applicant: Monarch Specialty Group, Inc., Chicago, IL (US)

(72) Inventors: Stephen Barrett Cichy, Chicago, IL (US); Markus Daniel Bockle, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

(21) Appl. No.: 18/971,391

(22) Filed: Dec. 6, 2024

(51) Int. Cl.
  G06F 9/451 (2018.01)
  G06Q 20/40 (2012.01)
(52) U.S. Cl.
  CPC ........... *G06F 9/453* (2018.02); *G06Q 20/405* (2013.01)
(58) Field of Classification Search
  CPC .............................. G06F 9/453; G06Q 20/405
  See application file for complete search history.

(56) References Cited

U.S. PATENT DOCUMENTS

| | | |
|---|---|---|
| 6,681,383 B1 * | 1/2004 | Pastor ........................ G06F 8/30 717/126 |
| 7,111,780 B2 | 9/2006 | Broussard |
| 7,840,424 B2 | 11/2010 | Wiley, II |
| 7,856,364 B1 | 12/2010 | Wiley, II |
| 7,979,285 B2 | 7/2011 | Wiley |
| 8,032,397 B2 | 10/2011 | Lawless |
| 8,036,913 B1 | 10/2011 | Pinsonneault |
| 8,036,914 B1 | 10/2011 | Pinsonneault |
| 8,036,918 B1 | 10/2011 | Pinsonneault |
| 8,050,943 B1 | 11/2011 | Wiley |
| 8,060,379 B1 | 11/2011 | Pinsonneault |
| 8,190,453 B2 | 5/2012 | Rowe, III |
| 8,392,214 B1 | 3/2013 | Pinsonneault |
| 8,392,219 B1 | 3/2013 | Pinsonneault |
| 8,589,181 B2 | 11/2013 | Berzansky |
| 8,670,999 B2 | 3/2014 | Berzansky |
| 8,781,854 B1 | 7/2014 | Harris, Sr. |
| 8,924,231 B2 | 12/2014 | Hoffman |
| 9,076,186 B2 | 7/2015 | Burkett |
| 9,231,935 B1 | 1/2016 | Bridge |
| 9,760,871 B1 | 9/2017 | Pourfallah |
| 9,904,965 B2 | 2/2018 | White |
| 10,157,262 B1 | 12/2018 | Pinsonneault |
| 10,192,193 B1 | 1/2019 | Glass |
| 10,248,641 B2 | 4/2019 | Wagh |
| 10,276,189 B1 * | 4/2019 | Brochu ................. G11B 27/00 |
| 10,417,380 B1 | 9/2019 | Kaye |
| 10,489,552 B2 | 11/2019 | Pinsonneault |

(Continued)

*Primary Examiner* — Tadesse Hailu
(74) *Attorney, Agent, or Firm* — Dentons US LLP

(57) ABSTRACT

This disclosure enables a rule engine programmed for (i) expressing complex logic, (ii) handling time/event synchronization, (iii) providing insights into rule execution, (iv) modeling uncertainties, or (v) helping a transaction to be completed in a meaningful or readily understood manner, yet customized for the transaction. Such configuration is technologically advantageous, because of its enablement in providing guidance to a user in completing the transaction with a help content that is readily-understood (e.g., in or involving natural language), yet customized for the transaction.

27 Claims, 3 Drawing Sheets

(56) References Cited

U.S. PATENT DOCUMENTS

| | | |
|---|---|---|
| 10,496,793 B1 | 12/2019 | Lawrence |
| 10,565,656 B1 | 2/2020 | Pinsonneault |
| 10,616,146 B1 | 4/2020 | Hopkins |
| 12,136,128 B2* | 11/2024 | Cichy .................... G06Q 40/08 |
| 2004/0153336 A1 | 8/2004 | Virdee |
| 2007/0276697 A1 | 11/2007 | Wiley |
| 2010/0217622 A1 | 8/2010 | Brown |
| 2011/0035219 A1* | 2/2011 | Kadirkamanathan ....................... G10L 15/187 707/769 |
| 2011/0145011 A1 | 6/2011 | Shell |
| 2011/0276531 A1* | 11/2011 | Bellamy, III .......... G06Q 30/06 706/47 |
| 2013/0054261 A1 | 2/2013 | Dufour |
| 2013/0211856 A1 | 8/2013 | Pribyl |
| 2013/0226608 A1 | 8/2013 | Di Lascia |
| 2014/0200928 A1 | 7/2014 | Watanabe |
| 2015/0228030 A1 | 8/2015 | Scantland |
| 2015/0234991 A1 | 8/2015 | Pinsonneault |
| 2019/0102411 A1* | 4/2019 | Hung .................... G06F 16/21 |
| 2022/0398667 A1* | 12/2022 | Cichy .................... G06Q 40/08 |
| 2024/0251114 A1* | 7/2024 | Rathi ................. H04N 21/2405 |
| 2024/0296501 A1* | 9/2024 | Cichy .................... G06Q 40/08 |
| 2024/0303434 A1* | 9/2024 | Shah ....................... G06F 9/451 |
| 2024/0403939 A1* | 12/2024 | Chang ............... G06Q 30/0631 |
| 2024/0419706 A1* | 12/2024 | Gutierrez .............. G06F 40/166 |
| 2025/0021611 A1* | 1/2025 | Gursha .................. G06F 16/13 |
| 2025/0078167 A1* | 3/2025 | Cichy .................... G06Q 40/08 |

\* cited by examiner

TECHNOLOGIES FOR ENABLING RULE ENGINES TO GUIDE USERS IN COMPLETING TRANSACTIONS BASED ON ENGAGING WITH LANGUAGE MODELS

TECHNICAL FIELD

This disclosure relates to rule engines that guide users in completing transactions based on engaging with language models.

BACKGROUND

Conventionally, a rule engine may be programmed to apply a business rule to an input (e.g., a message) received from a data source (e.g., an application program). This modality of computing promotes agility and adaptability for processes driven by dynamic rules and regulations, by decoupling a business logic from an application logic, thereby allowing a business user to modify the business logic, by modifying the business rule, without changing the application logic, especially when the data source is subject to change. Resultantly, the rule engine may be forward-chaining (e.g., processing condition-action rules) or reactive (e.g., detecting and reacting to events and patterns). However, despite the rule engine having such technological benefits, the rule engine still suffers from various technological drawbacks. For example, the rule engine may be limited in (i) expressing complex logic, (ii) handling time/event synchronization, (iii) providing insights into rule execution, (iv) modeling uncertainties, or (v) helping a transaction to be completed in a readily-understood manner, yet customized for the transaction.

SUMMARY

This disclosure enables a rule engine programmed for (i) expressing complex logic, (ii) handling time/event synchronization, (iii) providing insights into rule execution, (iv) modeling uncertainties, or (v) helping a transaction to be completed in a meaningful or readily understood manner, yet customized for the transaction. Such configuration is technologically advantageous, because of its enablement in providing guidance to a user in completing the transaction with a help content that is readily-understood (e.g., in or involving natural language), yet customized for the transaction.

DETAILED DESCRIPTION

Figure 1:
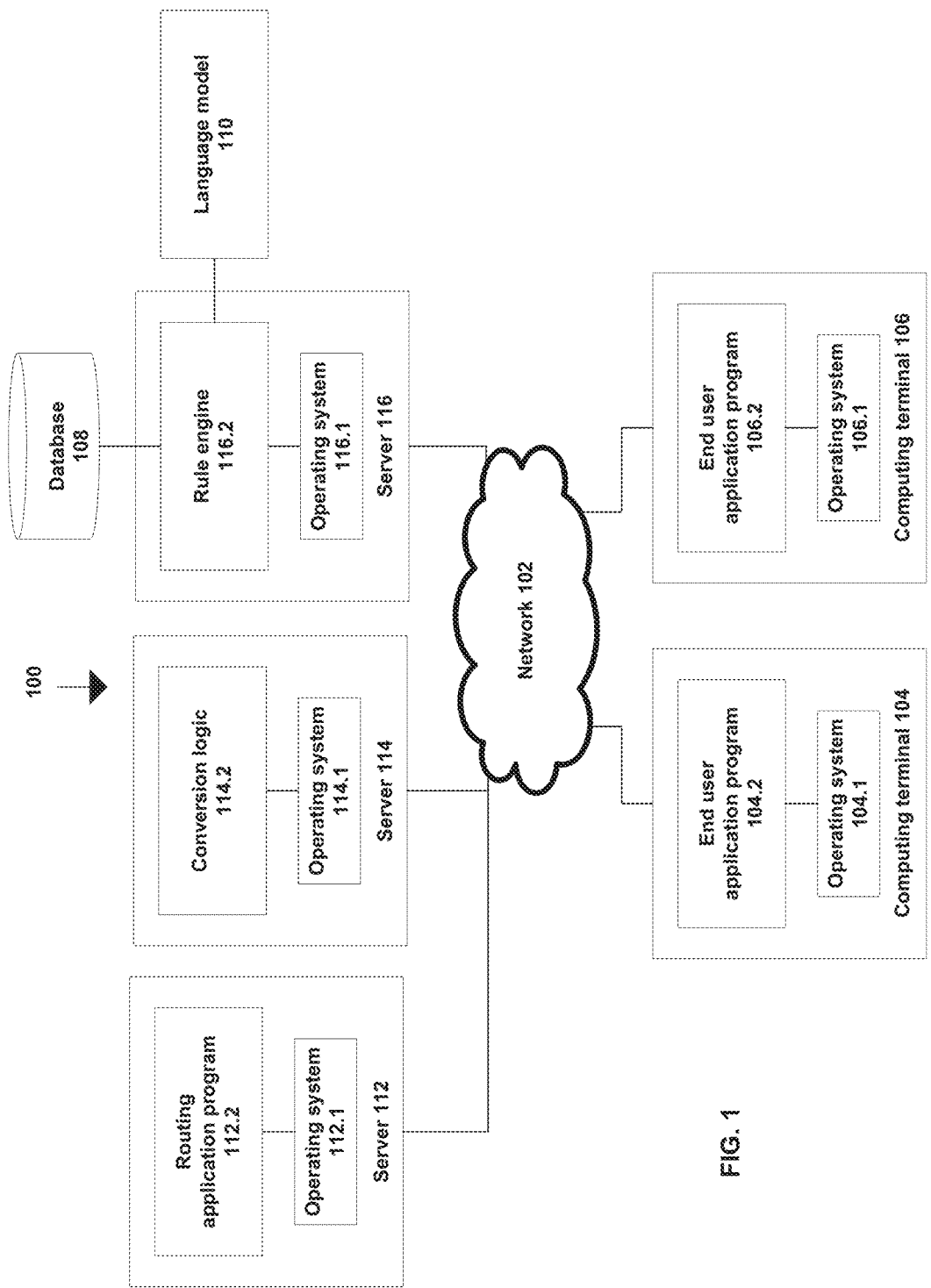
FIG. 1 shows a diagram of an embodiment of a system for providing guidance to end users in completing transactions based on engaging with language models according to this disclosure.

As explained above, this disclosure enables a rule engine programmed for (i) expressing complex logic, (ii) handling time/event synchronization, (iii) providing insights into rule execution, (iv) modeling uncertainties, or (v) helping a transaction to be completed in a meaningful or readily understood manner, yet customized for the transaction. Such configuration is technologically advantageous, because of its enablement in providing guidance to a user in completing the transaction with a help content that is readily-understood (e.g., in or involving natural language), yet customized for the transaction.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled persons.

Various terminology used herein can imply direct or indirect, full or partial, temporary or permanent, action or inaction, individual or collective. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes," "contains," "has," or "comprising," "including," "containing," or "having" (or any tenses thereof) when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

As used herein, a term "about" or "substantially" refers to a +/−10% variation from a nominal value/term. Such variation is always included in any given value/term provided herein, whether or not such variation is specifically referred thereto.

As used herein, a term "or others," "combination", "combinatory," "combinations thereof" or other similar expressions refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled persons understand that typically there is no limit on a number of items or terms in any combination, unless otherwise contextually apparent.

Features or functionality described with respect to certain embodiments may be combined or sub-combined in or with various embodiments in any permutational or combinatorial manner. Different aspects or elements of embodiments, as disclosed herein, may be combined or sub-combined in a similar manner. A skilled person will understand that typically there is no limit on a number of items or terms in any combination, unless otherwise contextually apparent Some embodiments, whether individually or collectively, can be components of a larger system, where other procedures can take precedence over or otherwise modify their application. Additionally, a number of steps can be required before, after, or concurrently with embodiments, as disclosed herein. Note that any or all methods or processes, at least as disclosed herein, can be at least partially performed via at least one entity in any manner.

Some embodiments are described herein with reference to illustrations of idealized embodiments (and intermediate structures) of this disclosure. As such, variations from various illustrated shapes as a result, for example, of manufacturing techniques or tolerances, are to be expected. Thus, various embodiments should not be construed as necessarily limited to various particular shapes of regions illustrated herein, but are to include deviations in shapes that result, for example, from manufacturing.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

United States Patent Application Publication 2022/0398667 (Serial 17/399,178) is incorporated by reference herein for all purposes. Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of an embodiment of a system for providing guidance to end users in completing transactions based on engaging with language models according to this disclosure. In particular, there is a system 100 containing a network 102, a first computing terminal 104, a second computing terminal 106, a database 108, a language model 110, a server 112 (first), a server 114 (second), and a server 116 (third).

The first computing terminal 104 hosts an operating system (OS) 104.1 and a first end user application program 104.2 (and potentially other application programs) such that the first end user application program 104.2 (and potentially other application programs) runs on the first OS 104.1. The second computing terminal 106 hosts an OS 106.1 and a second end user application program 106.2 (and potentially other application programs) such that the second end user application program 106.2 (and potentially other application programs) runs on the second OS 106.1.

The server 112 hosts an OS 112.1 and a routing application program 112.2 (and potentially other application programs) such that the routing application program 112.2 (and potentially other application programs) runs on the OS 112.1. The server 114 hosts an OS 114.1 and a conversion logic 114.2 (and potentially other logic or application programs) such that the conversion logic 114.2 (and potentially other logic or application programs) runs on the OS 114.1. The server 116 hosts an OS 116.1 and a rule engine 116.2 (and potentially other application programs) such that the rule engine 116.2 (and potentially other application programs) runs on the OS 116.1.

The database 108 is hosted external (e.g., physically, logically) to the server 116, although the server 116 may host the database 108. The language model 110 is hosted external (e.g., physically, logically) to the server 116, although the server 116 may host the language model 110.

The network 102 may be a Local Area Network (LAN), a Wide Area Network (WAN), a cellular network, a satellite network, or another suitable network, whether private or public. The network may include Internet.

The first computing terminal 104 or the second computing terminal 106 may be a desktop computer, a laptop computer, a tablet computer, a mobile phone, a smartphone, a wearable computer, a vehicular computer, a Point-Of-Sale computing terminal (e.g., a cash register), or another suitable computing form factor, whether stationary or mobile. For example, the first computing terminal 104 or the second computing terminal 106 may be a positioned (e.g., collocated) in a defined area (e.g., a room, a building, a store, a pharmacy, a hospital). For example, the first computing terminal 104 or the second computing terminal 106 may be a computing workstation that is freestanding, stationary, or standalone on a surface, such as a shelf, a tabletop, a floor, a carpet, a tile, or another suitable surface. For example, the computing workstation may be a desktop Personal Computer (PC) tower, a micro tower, a slim form factor, an All-In-One (AIO) desktop PC, a mini PC, a Small Form Factor (SFF), an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket. Note that in some embodiments the first computing terminal 104 and the second computing terminal 106 are separate and distinct from each other. However, in other embodiments, the first computing terminal 104 and the second computing terminal 106 are one computing terminal.

The first OS 104.1 or the second OS 106.1 may be Windows, Linux, MacOS, Android, IOS, or any other suitable OS.

The first end user application program 104.2 (and potentially other application programs) runs on the first OS 104.1. The first end user application program 104.2 may be a browser application program, a domain specific application program, or another suitable program. For example, the domain specific application program 104.2 may be a pharmacy application program (e.g., operated by a pharmacist or a pharmacy technician in a pharmacy locale) having a software logic/UIs programmed to manage prescriptions (e.g., by identifiers), a software logic/Ul programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The second end user application program 106.2 (and potentially other application programs) runs on the second OS 106.1. The second end user application program 106.2 may be a browser application program, a domain specific application program, or another suitable program. For example, the domain specific application program 106.2 may be a pharmacy application program (e.g., operated by a pharmacist or a pharmacy technician in a pharmacy locale) having a software logic/UIs programmed to manage prescriptions (e.g., by identifiers), a software logic/Ul programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The server 112 may be an application server or another suitable server. The OS 112.1 may be Windows, Linux, MacOS, Android, IOS, or any other suitable OS. The routing application program 112.2 runs on the OS 112.1. The routing application program 112.2 may be a message routing program that is programmed to facilitate efficient receiving, processing, and sending messages between various computing systems to enable corresponding transactions to be completed. For example, a transaction may correspond to a single message (one-to-one) or a set of messages (one-to-many). For example, the routing application program 112.2 may be a medical claim application program that is programmed to facilitate efficient receiving, processing, and sending of messages, which embody medical claims by content (e.g., text), submitted by pharmacies to insurance companies or payers. The medical claim application program may have a software logic/UIs programmed to route messages (e.g., medical claims) submitted by pharmacies computing systems to appropriate insurance computing systems or pharmacy benefit manager computing systems based on appropriate insurance coverage and plan information as validated based on contents of those messages. The medical claim application program may have a software logic/UIs programmed to perform initial editing and validation of messages (e.g., medical claims) to ensure that those messages meet a certain required format (if needed) and contain accurate data. The medical claim application program may have a software logic/UIs programmed to perform real-time transacting (e.g., adjudication by approval or denial) of messages (e.g., medical claims) by seamlessly integrating with payers' claims computing processing systems. The medical claim application program may have a software logic/UIs programmed to perform tracking and monitoring of statuses of submitted messages (e.g., medical claims), as well as generating reports and analytics. The medical claim application program may have a software logic/UIs programmed to integrate with existing pharmacy computing management systems, enabling seamless submission of messages (e.g., medical claims) from pharmacy workflows, while minimizing or eliminating manual data entry or separate computing systems.

The routing application program 112.2 may be programmed to route messaging based on parsing (e.g., textually) those messages. For example, such routing may occur based on a set of predefined business rules and logic to determine various appropriate paths and destinations for received messages (e.g., medical claims). As such, in context of medical claim processing, the routing application program 112.2 may have a message intake logic (e.g., a software module) that receives messages (e.g., medical claims) from various sources, such as providers, clearinghouses, or other healthcare entities (e.g., formatted pursuant to Electronic Data Interchange (EDI) X12 837). Further, the routing application program 112.2 may have a claim parsing logic (e.g., a software module) that parses (e.g., by text) messages (e.g., medical claims) to extract relevant information (e.g., text), such as patient details, provider information, diagnosis codes, procedure codes, and insurance details. Also, the routing application program 112.2 may have a rule evaluation logic (e.g., a software module) that, based on extracted claim data, evaluates a set of predefined business rules to determine an appropriate routing path. For example, these rules can be based on various factors, such as patient's insurance plan and network affiliations, provider's participation in specific networks or Preferred Provider Organizations (PPOs), geographic location of the provider or patients, claim type (e.g., medical, dental, institutional), presence of specific diagnosis or procedure codes, or other suitable factors. Moreover, the routing application program 112.2 may have a routing destination determination logic (e.g., a software module) that, based on evaluated rules, identifies appropriate destination(s) for routing messages (e.g., medical claims), such as computing systems (e.g., Application Programming Interfaces (APIs), File Transfer Protocol (FTP) sites, web portals) of payers or insurance companies, third-party administrators, repricing vendors or PPO networks, auditing or review entities, or other suitable destinations. Furthermore, the routing application program 112.2 may have a claim transmission logic (e.g., a software module) that transmits messages (e.g., medical claims) to identified destination(s) using appropriate EDI formats or secure FTP sites, APIs, web portals or other suitable data recipient software. This may involve point-to-point routing (e.g., direct transmission to recipients) or wrap routing (routing through intermediary networks or entities). Also, the routing application program 112.2 may have a tracking and auditing logic (e.g. a software module) that enables maintenance of an audit trail, tracking how messages move among data recipients and status throughout routing processes, such as by monitoring timestamps, recipient information, and any errors or exceptions encountered during routing. Additionally, the routing application program 112.2 may be have an exception handling logic (e.g., a software module) that handles issues or exceptions that may arise during routing (e.g., invalid data, missing information, rule conflicts), which may involve or enable alerts, notifications, or manual intervention workflows to resolve identified issues.

The server 114 may be an application server or another suitable server. The OS 114.1 may be Windows, Linux, MacOS, Android, IOS, or any other suitable OS. The OS 114.1 hosts the conversion logic 114.2, which may be embodied as an application program, a software module, a software engine (e.g., a task-dedicated software logic that can be started, stopped, or paused), an API, or another suitable logical form factor. For example, if embodied as the API, then the API may be a Representational State Transfer (REST) API, a Simple Object Access Protocol (SOAP) API, or another suitable API. The conversion logic 114.2 may be programmed to convert messages from one data format (e.g., flat file, matrix format, National Council for Prescription Drug Programs (NCPDP) format) to another data format (e.g., structured, delimited, Java Script Object Notation (JSON), Extensible Markup Language (XML), Comma Separated Values (CSV)) or vice versa. For example, the conversion logic 114.2 may receive a message (e.g., a request) in one data format and convert the message into another data format before outputting for downstream processing, as further described below. For example, the message may be received in a flat file data format, a matrix data format, a NCPDP format, or another suitable format. For example, the message may have the format of a flat file format for transmitting messages (e.g., pharmacy claims and related transactions), where the message may contain segments and segments may contain fields, where each field may contain a single data element (e.g., a name, a identifier, a drug code, a quantity), where fields and segments may be separated by non-printable ASCII characters, such as a record separator and a field separator, where the format may support various data types, such as strings, dates, integers, and decimal numbers, where numeric fields can be zero-padded, or use a "signed overpunch" technique to encode negative values. For example, for batch transmission, the format may define headers and trailers to separate multiple transactions within a single file, such as using separators to indicate start of text and end of text. For example, the format may be a flat file format having segments separated by record separators, with fields within segments separated by field separators, supporting different data types using techniques, such as zero-padding and signed overpunch. For example, the format may be NCPDP or another suitable format. For example, the conversion logic 114.2 may be programmed to receive a message (e.g., a medical claim) from the routing application program 112.2 and convert, similar to above, the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rule engine 116.2 to process the message, as converted (or a copy thereof), as disclosed herein. Likewise, the conversion logic 114.2 may be programmed to receive a message (e.g., an approval or a denial of a medical claim) from the rule engine 116.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 112.2 to process the message, as converted (or a copy thereof), as disclosed herein.

The server 116 may be an application server or another suitable server. The server 116, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 116 or the server 116 can operate as the mainframe in some embodiments. In some embodiments, the server 114 and the server 116 may be one server.

The OS 116.1 may be Windows, Linux, MacOS, Android, IOS, or any other suitable OS. The rule engine 116.2 runs on the OS 116.1. The rule engine 116.2 may be a software system (e.g., a software logic, an application program, a software module) that executes business rules in a runtime environment by business users (from computing terminals) to define, manage, and automate decision-making processes based on predefined rules. For example, the rule engine 116.2 may be a task-dedicated software logic that can be started, stopped, or paused. For example, in context of medical claim processing, the rule engine 116.2 may enable automating of evaluation and adjudication of transactions based on messages (e.g., medical claims) input thereinto based on various criteria and policies, as set over the network 102 by computing terminals operated by business users. In some embodiments, the rule engine 116.2 may host the conversion logic 114.2 or the conversion logic may host the rule engine 116.2. In some embodiments, the rule engine 116.2 and the conversion logic 114.2 may be one software logic, component, application, or another suitable software form factor.

The rule engine 116.2 may have (i) a rule repository (e.g., a database) programmed to store a set of rules, (ii) a rule editor (e.g., a user interface) programmed to define, modify, and organize the set of rules using natural language or domain-specific languages as accessed from a computing terminal, (iii) a rule execution logic (e.g., a software architecture, a software module) programmed to interpret and evaluate various rules against input data or scenarios (e.g., applying rules and generating appropriate outcomes), and (iv) an integration interface (e.g., a software architecture, a software module) programmed to communicably integrate with other computing systems (e.g., EHR software, medical claim management software), to access relevant data and share those results. For example, in context of medical claim processing, the rule engine 116.2 may be used to automate various decision-making processes based on a set of predefined rules. For example, some of such rules may be (i) claim eligibility rules (e.g., if a patient's policy is not active or has expired, then reject this claim), (ii) medical coding rules (e.g., if a medical coding on a claim contains an invalid or inconsistent combination of codes, then flag the claim for review), (iii) benefit limit rules (e.g., if a claim requests an amount that exceeds an annual or lifetime benefit limit for a patient's policy, then reject or partially approve the claim), (iv) pre-existing condition rules (e.g., if a claim for a patient is related to a pre-existing condition and the patient is within his waiting period, then reject the claim), (v) claim adjudication rules (e.g., calculate a patient's deductible, co-pay, and coinsurance amounts based on a set of policy terms), (vi) compliance and regulatory rules (e.g., ensure that a claim adheres to relevant healthcare regulations, coding guidelines, and billing practices).

Some examples of business rules executable by the rule engine 116.2 may include business rules for authorization processes, workflow processes, messaging processes, e-payment processes, and other suitable processes. Some business rules may be based on Boolean logic and include if-then (or other suitable) statements, whether standalone, chained, branched, or otherwise. Some business rules may enable enrichment of messages (e.g., medical claims) by metadata, such as descriptive metadata, preservation metadata, structural metadata, provenance metadata, definitional metadata, administrative metadata, computational transaction metadata, or other suitable metadata. For example, in context of medical claim processing, the descriptive metadata may be information that describes contents and key attributes of medical claims data to aid in identification, organization, and discovery of medical claims within databases or repositories, such as claim identifiers, patient name, date of service, provider name, diagnosis codes, procedure codes, billing codes, and claim status. For example, in context of medical claim processing, the preservation metadata may be information that supports and documents long-term preservation and accessibility of electronic medical claims data, such as technical details about file formats, software, fixity information (e.g., checksums, digital signatures), chain of custody, data transformations, data permissioning, data migration, and systems used to create and manage medical claims data. For example, in context of medical claim processing, the structural metadata may be information that describes organization, structure, and relationships within medical claims data, such as internal structure and components of messages (e.g., medical claims), different sections or fields within data structures (e.g., documents, files), different data elements within messages (e.g., medical claims), such as linking diagnosis codes to specific procedure identifiers or service identifiers, different connections between messages (e.g., medical claims) and related documents or files, such as supporting medical records, attachments, or supplemental information, hierarchical structure of claims data, such as how individual messages (e.g., medical claims) are organized within larger claim batches or submissions, different file formats, data types, and technical specifications used to store and transmit medical claims data, different data integrations by mapping structures of claims data to standardized data models or schemas used in claims processing systems. For example, in context of medical claim processing, the provenance metadata may be information that tracks origin, history, and lineage of medical claims data by providing detailed audit trails of data sources, transformations, and processes involved in creation/handling of messages (e.g., medical claims), such as identifiers of healthcare providers, insurance companies that generated initial claims data, information about computing systems, applications, and tools used to process, transform, or transmit messages (e.g., medical claims) at various stages, sequences of actions, processes, and any modifications applied to claims data, establishing clear data lineages, identifies user profiles permissioned for creating, modifying, or approving messages (e.g., medical claims) at different points in time, various timestamps and versioning information to reconstruct the chronological history of changes to messages (e.g., medical claims). For example, in context of medical claim processing, the definitional metadata may be information that indicates meaning and semantics of data elements within messages (e.g., medical claims), such as definitions or descriptions of codes (e.g., International Classification of Diseases (ICD), Current Procedural Terminology (CPT), National Drug Code (NDC)) used in claims, explanations of terminology or abbreviations used in data fields within messages (e.g., medical claims), data dictionaries or glossaries that provide precise meaning of data elements like claim types, billing statuses, or provider specialties, details on how specific data values are calculated or derived, such as claim payment amounts based on coverage rules, mappings between coded values in claims and their textual descriptions or labels, and business rules or validation criteria that define acceptable values or formats for claims data. For example, in context of medical claim processing, the administrative metadata may be structured data elements that provide essential information about medical services rendered, patient details, provider information, and billing codes to enable accurate claims processing, reimbursement, and data analysis. The administrative metadata may include patient information (e.g., patient name, date of birth, gender, address, insurance policy number, group number, patient medical record number), provider information (e.g., provider name, National Provider Identifier (NPI), provider specialty, taxonomy codes, provider address, contact information), service details (e.g., service date(s), diagnosis codes (e.g., ICD codes) describing patient's condition, procedure codes (e.g., CPT codes) for services rendered, service location), billing information (e.g., charges for each service, modifiers for procedures, place of service codes, rendering provider information). For example, the administrative metadata can be on standardized claim forms, such as CMS-1500 or UB-04, or in EDI formats, such as X12 837. For example, in context of medical claim processing, the computational transaction metadata may be information (e.g., textual, structured, unstructured, descriptive) that provides context and details beyond a basic transaction information, such as sender, receiver, and an amount of payments indicated or stated to be transferred. This information may enhance at least some efficiency, accuracy, and automation of claim (e.g., message) processing. For example, the computational transaction metadata may include patient or provider demographics, such as a member identification number (e.g., a unique identifier for a patient), a national provider identifier (e.g., a unique identifier for a healthcare providers), a claim reference number (e.g., a unique identifier for each claim, facilitating tracking and re-association of attachments with the correct transaction. For example, the computational transaction metadata may include transaction details, such as service dates, procedure codes (e.g., standardized codes, CPT, ICD or others that describe medical procedures and diagnoses), billing information (e.g., details about various costs associated with various services provided). For example, the computational transaction metadata may include attachments and documentation, such as electronic attachments (e.g., documents, medical records, lab results, and imaging reports that support a particular claim and metadata may help in re-association of these attachments with corresponding claims) and reference numbers (e.g., link attachments to correct administrative transactions to reducing manual intervention). For example, the computational transaction metadata may include policy and authorization data, such as pre-authorization information (e.g., data regarding prior approvals for specific treatments or procedures) and policy details (e.g., information about patient's insurance coverage including limits and exclusions). For example, the computational transaction metadata may include security and compliance information, such as encryption and digital signatures or audit trails (e.g., metadata that tracks who accessed or modified a data item to ensure compliance with regulations like HIPAA). Therefore, the computational transaction metadata may improve accuracy (e.g., reducing errors in matching information), automation (e.g., providing structured data for interpretation by machine learning or other automation software), and data management (e.g., organization of large volumes of data to efficiently expedite workflow), while staying compliant with regulatory requirements, protective sensitive information and ensuring secure transactions. As such, the rule engine 116.2 may be programmed to enrich messages (e.g., medical claims) with various metadata for application via the business rules.

The database 108 may be a relational database, a graph database, a vector database, a multi-model database or another suitable database. The rule engine 116.2 is programmed to interface (e.g., read, write, delete, query, retrieve, store, search) with the database 108. The database 108 is shown to be hosted off the server 116, which may be on another server (e.g., a database server hosting a DBMS). However, note that this configuration is not required and the server 116 may host the database 108 such that the database 108 runs on the OS 116.1, which may enable the rule engine 116.2 to apply rules more efficiently (e.g., faster).

The database 108 may have a schema (e.g., flat, hierarchical, network, relational, star, snowflake) according to which the database 108 stores its records. For example, in context of medical claim processing, the database 108 may have a set of tables (e.g., related to each other by a primary key) storing data (e.g., textual, structured, unstructured, descriptive) for configurations of patient profiles (e.g., personal information, medical history), a set of tables (e.g., related to each other by a primary key) storing data (e.g., textual, structured, unstructured, descriptive) for configurations of payor profiles (e.g., policy information, policy limits), a set of tables (e.g., related to each other by a primary key) storing data (e.g., textual, structured, unstructured, descriptive) for configurations of prescription profiles (e.g., dosages, side effects), a set of tables (e.g., related to each other by a primary key) storing data (e.g., textual, structured, unstructured, descriptive) for configurations of prescriber profiles (e.g., personal information, prescription history), a set of tables (e.g., related to each other by a primary key) storing data (e.g., textual, structured, unstructured, descriptive) for configurations of product profiles (e.g., name, dosages), a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other by a primary key) storing data (e.g., textual, structured, unstructured, descriptive) for configurations of place of service profiles (e.g., a set of attributes descriptive of a physical pharmacy). At least two of these sets of tables may be related to each other (e.g., via a primary key).

The database 108 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

The language model 110 may be hosted on a server separate and distinct from the server 116 or a cloud computing instance separate and distinct from the server 116. However, this configuration is not required. For example, the server 116 may host the language model 110, the OS 116.1 may host the language model 110, or the rule engine 116.2 may host the language model 110. Regardless of how the language model 110 is hosted, the rule engine 116.2 may communicate or interface with the language model 110, as disclosed herein.

The language model 110 may be a language model (e.g., a generative artificial intelligence (AI) model, a generative adversarial network (GAN) model, a generative pre-trained transformer (GPT) model) including an artificial neural network (ANN) with a set of parameters (e.g., tens of weights, hundreds of weights, thousands of weights, millions of weights, billions of weights, trillions of weights), initially trained on a quantity of label or unlabeled content (e.g., text, unstructured text, descriptive text, imagery, sounds) using a self-supervised learning algorithm or a semi-supervised learning algorithm to understand a set of corresponding data relationships. Then, the language model 110 may be further trained by fine-tuning or refining the set of corresponding data relationships via a supervised learning algorithm or a reinforcement learning algorithm.

There may be several approaches to train the language model 110 to operate as disclosed herein. One approach to train the language model 110 may involve a supervised learning technique, where a set of data includes a set of labeled examples, for each data point to include features (covariates) and an associated label, to have a learning function that is inferred and maps feature vectors (inputs) to labels (output), based on example input-output pairs. Therefore, the learning function may be inferred from labeled training data containing a set of training examples (e.g., each example is a pair including an input object (e.g., a vector) and a desired output value (e.g., a supervisory signal)).

The language model 110 may be a general purpose model, which may excel at a range of tasks (e.g., generating a content for a user consumption) and may be prompted, i.e., programmed to receive a prompt (e.g. a request, a command, a query), to do something or accomplish a certain task. The language model 110 may be prompted via the rule engine 116.2. The language model 110 may be embodied as or accessible via a chatbot hosted on a server hosting the language model 110 or another server, where the rule engine 116.2 may chat with the chatbot in a human-readable form, where the human-readable form may be an unstructured text or a descriptive text for the chatbot to output a content (e.g., a text, an unstructured text, a descriptive text, an image, a sound), i.e., to do something or accomplish a certain task. The chatbot may be separate and distinct from the language model 110 or the rule engine 116.2, or the language model 110 or the rule engine 116.2 may include the chatbot, or the chatbot may include the language model 110 or the rule engine 116.2.

The language model 110 may be a Large Language Model (LLM), a Small Language Model (SLM), or another suitable model. For example, the language model 110 may be an LLM engine or model, such as GPT-3, GPT-4, PaLM-2, Google Gemini, Perplexity, Microsoft Copilot, or another suitable language model, where the LLM engine may be a task-dedicated computing program that may be started, paused, or stopped. For example, the language model 110 may be a LLM, a SLM, a fine-tuned language model, an edge language model, or another suitable language model. The language model 110 may be authorized for access by a provider (e.g., a network-based data source) that supply or provide access (e.g., credentialed) to the language model 110 via an API to enable an input of a prompt into the language model 110, where the prompt may be text (or another form of suitable content) given to the language model 110 as an instruction for an action. For example, the language model 110 may be embodied as or accessible via a ChatGPT AI chatbot developed by OpenAI, based on OpenAI's GPT-3.5 and GPT-4 models and fine-tuned using supervised and reinforcement learning algorithms, which may include improvements thereto. Likewise, the language model 110 may be embodied as or accessible via a Google Gemini AI chatbot developed by Google, based on a PaLM model, which may include improvements thereto. Regardless, once the language model 110 is trained, as disclosed herein, the language model 110 is structured to have a data structure and organized to have a data organization. As such, the data structure and the data organization collectively enable the language model 110 to be prompted, as disclosed herein. For example, the language model 110 may be trained to output a help content (e.g., texts, videos, images, sounds) responsive to a prompt (e.g., texts, videos, images, sounds) submitted to the language model 110 based on an input (e.g., texts, videos, images, sounds) into the rule engine 161.2 and an output (e.g., texts, videos, images, sounds) from the rule engine 116.2 responsive to the input, as disclosed herein.

The rule engine 116.2 may be built via or on top of a software development language integration framework (e.g., LangChain framework) designed to simplify at least some creation of applications using language models, including the language model 110 (e.g., to be data aware or agentic). The software development language integration framework can be used for chatbots, Generative Question-Answering (GQA), summarization, and other techniques suitable for algorithms disclosed herein, by chaining together different components to create more advanced use cases around the language model 110.

In situations where at least the language model 110 needs to be augmented with private data, a toolkit to help perform this data augmentation (e.g., Llamaindex toolkit, GPT Index toolkit) may be used. The toolkit may be used by the rule engine 116.2 or be included in the rule engine 116.2. The toolkit may provide data connectors to ingest existing data sources and data formats (e.g., data files, portable document format files, productivity suite files, source code strings, source code strings for domain-specific languages used in programming and designed for managing data held in relational database management systems). The toolkit may provide ways to structure data (e.g., indices, graphs) so that this data can be used with the language model 110. The toolkit may provide an advanced retrieval/query interface over data, a prompt may be fed into the language model 110 to get back retrieved context and knowledge-augmented output. The toolkit may provide or allow integrations with an outer application framework (e.g. LangChain framework, Flask framework, Docker framework, ChatGPT chatbot). For example, the rule engine 116.2 can invoke or utilize LangChain framework and Llama toolkit. The toolkit may provide customizing or extending software modules (e.g., data connectors, indices, retrievers, query engines, reranking modules), as needed.

In situations where at least more precision may be needed, the rule engine 116.2 may include or interface with an AI agent (e.g., Auto-GPT agent) that, given a goal in natural language (e.g., human-readable unstructured or descriptive text), attempts to reach the goal by breaking the goal into a set of sub-tasks and using the network 102 (e.g., Internet) and other tools in an automatic looping process. For example, the AI agent may assigns itself new objectives to work on with a focus on achieving a greater goal, without manual input, by executing responses to prompts to accomplish a goal task, and in doing so will create and revise its own prompts to recursive instances in response to new information. The AI agent may manage its short-term or long-term memory by writing to and reading from databases and files, manage context window length requirements with summarization, may perform network-based actions (e.g., unattended web searching interactions, unattended web form interactions, unattended API interactions), or others. For example, the rule engine 116.2 can invoke or utilize LangChain framework and Llama toolkit, together with the AI agent.

Figure 2:
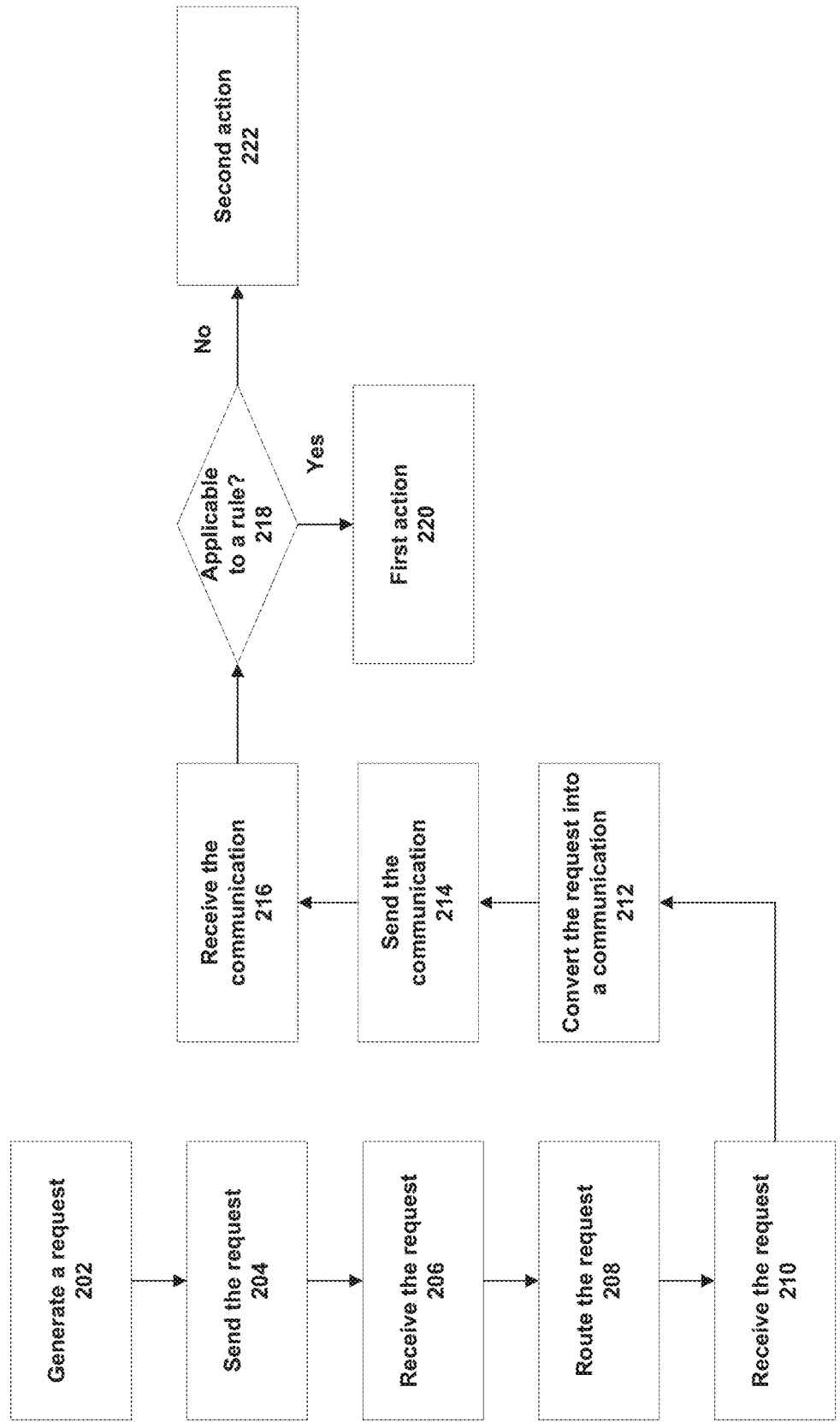
FIG. 2 shows a flowchart of an embodiment of a method for providing guidance to end users in completing transactions based on engaging with language models using the system of FIG. 1 according to this disclosure.
Figure 3:
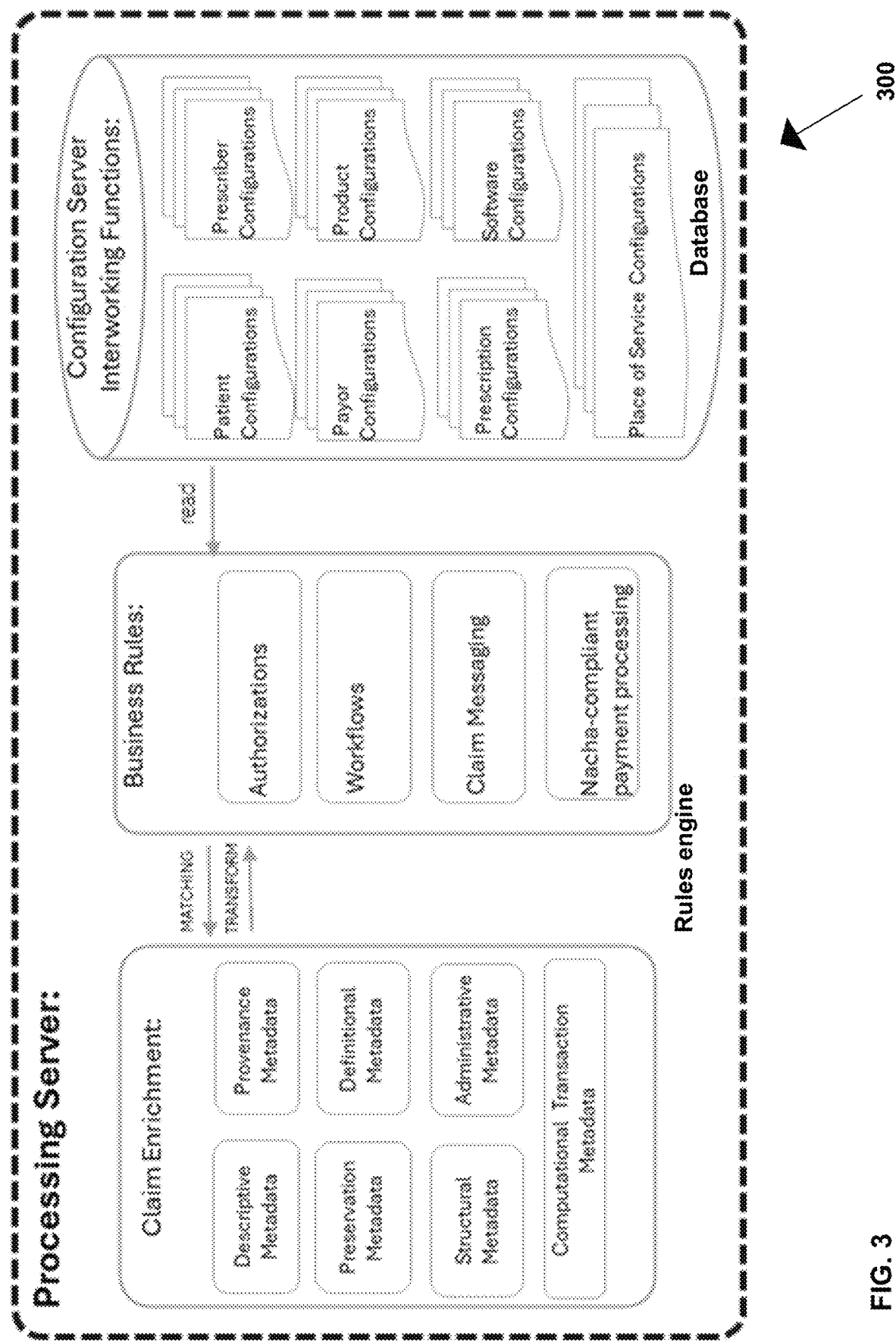
FIG. 3 shows a diagram of an embodiment of a rule engine and an embodiment of a database each configured for use in the system of FIG. 1 to perform the method of FIG. 2 according to this disclosure.

FIG. 2 shows a flowchart of an embodiment of a method for providing guidance to end users in completing transactions based on engaging with language models using the system of FIG. 1 according to this disclosure. FIG. 3 shows a diagram of an embodiment of a rule engine and an embodiment of a database each configured for use in the system of FIG. 1 to perform the method of FIG. 2 according to this disclosure. In particular, there is a process 200 having a set of blocks 202-222 performed by the system 100.

In block 202, the first end user application program 104.2 generates a request (e.g., a message containing an alphanumeric content expressing a medical claim) associated with a profile (e.g., a patient profile). The request may be generated based on an input (e.g., a physical or virtual keyboard, a microphone, a camera) from a user (e.g., a pharmacist or a pharmacy technician) operating the first end user application program 104.2 in a locale (e.g., a room, a building, a pharmacy, a hospital) or received from a data source (e.g., an API, an FTP site) over the network 102. For example, if the first end user application program 104.2 is the browser application program, then the browser application program may be logged into a web-based pharmacy application program over the network 102 to generate the request, where the web-based pharmacy application program is hosted in a server remote from the first computing terminal 104, the second computing terminal 106, the database 108, the language model 110, the server 112, the server 114, or the server 116. For example, if the first end user application program 104.2 is the pharmacy application program, then the pharmacy application program generates the request. The request may have various data (e.g., an alphanumeric content), such as patient data, medication data, dosage data, insurance data, or other suitable data, according to what is described in context of FIG. 1. The request may be formatted in a first data format, such as a structured format, delimited format, a flat data file, an NCPDP format, a matrix format, an XML format, or another suitable format.

In block 204, the first end user application program 104.2 sends the request (or a copy thereof) in the first data format to the routing application program 112.2 over the network 102 from the first computing terminal 104 to the server 112, which may be instructed by the user.

In block 206, the routing application program 112.2 receives the request (or a copy thereof) in the first data format from the first end user application program 104.2 over the network 102 from the first computing terminal 104 at the server 112.

In block 208, the routing application program 112.2 routes (e.g., switches, sends) the request (or a copy thereof) in the first data format to the conversion logic 114.2 hosted on the server 114. The routing application program 112.2 may route the request based on what content is inside the request or information sourced from the request, according to what is described in context of FIG. 1. For example, such routing may be physical or logical, which may be indicated based on addressing or routing information inside the request, as instructed by the user at the first end user application program 104.2.

In block 210, the conversion logic 114.2 receives the request (or a copy thereof) in the first data format from the routing application program 112.2 over the network 102 from the server 112 at the server 114.

In block 212, the conversion logic 114.2 converts the request (or a copy thereof) into a communication (e.g., a message) in a second data format different from the first data format in which the request was received by the conversion logic 114.2. Such conversion may be on receipt of the request in the first data format by the conversion logic 114.2 from the routing application program 112.2. As such, the communication in the second data format may be generated based on the request or may contain information sourced (e.g. copied) from the request. For example, such generation may involve converting or formatting the communication into the second data format different from how the request is formatted in the first data format when received from the first end user application program 104.2. For example, the second data format may be a structured format, a delimited format, a hierarchical format, a tree format, a graph format, a CSV format, a JSON format, an XML format, or another suitable format. For example, if the request was received formatted in the first data format, such as a flat data file, a NCPDP format, a matrix format, or another suitable format, then the communication may be converted to be formatted in the second data format, such as a structured format, a delimited format, a hierarchical format, a tree format, a graph format, a CSV format, a JSON format, an XML format, or another suitable format. For example, the first data format may be NCPDP format and the second data format is a structured format (e.g., JSON, XML, CSV).

In block 214, the conversion logic 114.2 sends the communication (or a copy thereof) in the second data format to the rule engine 116.2 over the network 102 from the server 114 to the server 116.

In block 216, the rule engine 116.2 receives the communication (or a copy thereof) in the second data format over the network 102 from the server 114 at the server 116.

In block 218, since, as explained above, the rule engine 116.2 has the set of rules, the rule engine 116.2 determines whether the communication is applicable to at least one rule of the set of the rules. For example, the rule engine 116.2 may contain a set of business rules, which may be set by a computing terminal (e.g., a desktop computer, a laptop computer), where an applicability of the communication to at least one rule of the set of rules may may be associated with or a grant (partial or full) of an approval (partial or full) of a transaction based on or involving the request, whereas an inapplicability of the communication to at least one rule of the set of rules may may associated with or an issuance (partial or full) of a denial (partial or full) of the transaction based on or involving the request. For example, the rule engine 116.2 may be programmed for business rules to be forward-chaining (e.g., processing condition-action rules) or reactive (e.g., detecting and reacting to events and patterns). As such, the rule engine 116.2 may receive the communication (or a copy thereof) in the second data format and determine whether the communication in the second data format is applicable to at least one rule of the set of rules. For example, the rule engine 116.2 may receive the communication (or a copy thereof) in the second data format from the routing application program 112.2 through the conversion logic 114.2, as mentioned above. As such, the rule engine 116.2 may receive the communication (or a copy thereof) in the second data format as converted by the conversion logic 114.2. The rule engine 116.2 may determine whether the communication is applicable to at least one rule of the set of rules based on sourcing (e.g., copying) information (e.g. alphanumeric content in fields) from the communication in the second data format and attempting to apply such information to at least one rule of the set of rules, or vice versa. Note that during or to further enable the rule engine 116.2 to determine whether the communication is applicable to at least one rule of the set of the rules, the rule engine 116.2 may access various metadata, as described in context of FIG. 1, to enrich (e.g., augment, supplement) the communication and then query the database 108, if needed, for more relevant or additional information to determine whether the communication is applicable to at least one rule of the set of the rules, or vice versa. One example of this metadata is disclosed in context of FIG. 3. Note that the server 116 may or may not host the language model 110.

In block 220, if the rule engine 116.2 determines in block 218 that the communication is applicable to at least one rule of the set of the rules (yes), then the rule engine 116.2 takes (e.g., performs) a first action (which may include a plurality of tasks) based on the communication being applicable to at least one rule of the set of rules. For example, the communication may be applicable such that the request originating from the first end user application program 104.2 is approved or denied (partially or fully) or indicated to be approved or denied (partially or fully).

Since the language model 110 may be trained to output a help content (e.g., texts, videos, images, sounds) responsive to a prompt (e.g., texts, videos, images, sounds) submitted to the language model 110 by the rule engine 116.2 based on an input (e.g., texts, videos, images, sounds) into the rule engine 116.2 and an output (e.g., texts, videos, images, sounds) from the rule engine 116.2 responsive to the input, as disclosed herein, the first action may include the rule engine 116.2 performing various tasks. These tasks may include (a) generating a first response (e.g., a message) to the communication containing an approval (full or partial) or a denial (full or partial) of the request, where the first response may be organized in the second data format, (b) generating the prompt based on the input into the rule engine 116.2 containing the communication (or a copy thereof) organized in the second data format and the output from the rule engine 116.2 organized in the second data format and containing the first response to the communication containing the approval or the denial (or a copy thereof), (c) submitting (e.g., prompting, inputting) the prompt to the language model 110, (d) receiving the help content output from the language model 110 responsive to the prompt being submitted to the language model, (e) generating a second response (e.g., a message) to the communication containing (i) the first response to the communication containing the approval or the denial and (ii) the help content, where the second response may be generated in the second data format, and sending the second response in the second data format to the conversion logic 114.2.

The help content may be in or involve natural language (although this is not required) to enable easy understanding as to why the request is partially or fully approved, or partially or fully denied. The help content may include a textual content (e.g., an unstructured text, a structured text), an image content (e.g., a graphic, a diagram, a video), a sound content (e.g., a tone, a music, a song, a speech), or another suitable content type. The help content may be generated in a human language (i) associated with the first computing terminal 104 (e.g., associated with a user profile originating the request) or (ii) determined based on a language setting (e.g., English, German, Spanish, Dutch, Russian, Hebrew, Mandarin, Arabic, Hindi) on the first computing terminal 104 or the first end user application program 104.2 (e.g., a language encoding, a browser setting). The request originating from the first end user application program 104.2 may include the language setting or an indication of association of the human language with the first computing terminal 104. As such, regardless of the human language, the help content may provide an easy understanding as to why the request is partially or fully approved, or partially or fully denied, i.e., approval is a partial or a full approval or the denial is a partial or a full denial.

The conversion logic 114.2 may receive the second response (or a copy thereof) in the second data format, generate a reply (e.g., a message) in the first data format based on the second response containing (i) the approval (full or partial) or the denial (full or partial) and (ii) the help content, and send the reply (or a copy thereof) to the routing application program 112.2. Then, the routing application program 112.2 receives the reply (or a copy thereof) and routes the reply (or a copy thereof) to the first computing terminal 104, which may include the first end user application program 104.2, responsive to the request.

The reply may be output (e.g., presented, displayed, sounded) on the first computing terminal 104, which may be via the first end user application program 104.2. As such, when the help content is output on the first computer terminal 104, which may be via the first end user application program 104.2, the help content may provide useful or guidance customized information in a readily-understood manner (e.g., in or involving natural language) to the user operating the first end user application program 104.2, who originated the request via the first end user application program 104.2. Therefore, the user may readily understand as to why the request is partially or fully approved, or partially or fully denied. Resultantly, the help content may be technologically advantageous because the rule engine 116.2 may be programmed for (i) expressing complex logic, (ii) handling time/event synchronization, (iii) providing insights into rule execution, (iv) modeling uncertainties, or (v) helping a transaction to be completed in a meaningful or readily understood manner, yet customized for the transaction. Such configuration is technologically advantageous, because of its enablement in providing guidance to the user, who originated the request via the first end user application program 104.2, in completing the transaction with the help content that is readily-understood (e.g., in or involving natural language), yet customized for the transaction. As described above, such customization may be based on the language model 110 being pre-trained at least on a set of data (labeled or unlabeled) involving (i) the first response to the communication containing the approval or the denial of the request, where the first response may be organized in the second data format, (ii) the input into the rule engine 116.2 containing the communication (or a copy thereof) organized in the second data format, and (iii) the output from the rule engine 116.2 organized in the second data format and containing the first response to the communication containing the approval or the denial (or a copy thereof).

Since the database 108 may be accessible by the rule engine 116.2, the database 108 may store a history of requests predating the request submitted to the rule engine 116.2 and associated with the profile. As such, the rule engine 116.2 may generate the prompt based on the history of requests. For example, some prior requests may relate to same or similar profiles as the request or same or similar information as the request. As such, the rule engine 116.2 may mine the history of requests to identify same or similar requests in the history of requests, source (e.g., copy, format) relevant data from such requests as needed, and insert (e.g., write) such data into the prompt as needed. For example, the help content may be generated based on the history of requests on a per-request basis (e.g., based on considering one prior request a time) or a per-identifier basis. For example, the per identifier basis is a per-person basis (e.g., a patient profile) or a per-entity basis (e.g., a caretaker profile, a physician profile, a medical practice profile, a hospital profile, a pharmacy profile).

In block 222, if the rule engine 116.2 determines in block 218 that the communication is inapplicable (not applicable) to at least one rule of the set of the rules (no), then the rule engine 116.2 takes (e.g., performs) a second action based on the communication being inapplicable to at least one rule of the set of rules. For example, there may be a full denial and the second action may be issue a warning indicating the communication being fully inapplicable to at least one rule of the set of rules. As such, the request may be resubmitted in the first data format from the first end user application program 104.2 to the conversion logic 114.2 to repeat steps 202-222, as described above, based on (e.g., responsive to or included in) the second action, especially when there is a limit on such iteration. This step may be repeated indefinitely or until a cap (e.g., 3 times) is reached and an error or a help message may be displayed on the first end user application program 104.2. Note that the request may be amended at the first end user application program 104.2 (e.g., fix what was wrong with the request originally) before being resubmitted in the first data format from the first end user application program 104.2 to the conversion logic 114.2 based on the second action.

Note that the first computing terminal 104 and the second computing terminal 106 may be one first/second computing terminal 104/106. However, the first computing terminal 104 and the second computing terminal 106 may physically separate and distinct from each other. Therefore, the process 200 may involve the first computing terminal 104 originating the request and the second computing terminal 106 receiving the reply to be output (e.g., presented, displayed, sounded) on the second computing terminal 106, which may be via the second end user application program 106.2, as described above. As such, the first computing terminal 104 and the second computing terminal 106 may be collocated (e.g., same room, same cubicle). For example, the first computing terminal 104 and the second computing terminal 106 may be co-positioned in a defined physical area (e.g., a cubicle, a room). For example, the first computing terminal 104 and the second computing terminal 106 may be physically collocated within the defined physical area. For example, the first computing terminal 104 and the second computing terminal 106 may be spaced apart from each other at about 1 meter or less, whether on a horizontal plane, a vertical plane, or a diagonal plane, which may allow the first computing terminal 104 and the second computing terminal 106 to simultaneously be within a physical reach of a hand of a user operating the first computing terminal 104 and the second computing terminal 106 (e.g., similar to an airplane cockpit). For example, the first computing terminal 104 and the second computing terminal 106 may be positioned side-by-side each other to simultaneously be within the physical reach of the hand of the user operating the first computing terminal 104 and the second computing terminal 106 (e.g., similar to an airplane cockpit). For example, the second computing terminal 106 may be attached (e.g., via an articulating arm, a stand, a bracket) to the first computing terminal 104 or a surface adjacent thereto (e.g., a wall). For example, the first computing terminal 104 and the second computing terminal 106 may be disposed on a common surface (e.g., a shelf, a tabletop, a stand). However, note that this configuration is not required and the first computing terminal 104 and the second computing terminal 106 may be disposed on different surfaces (e.g., one on a shelf and one on a tabletop). Likewise, note that the first computing terminal 104 and the second computing terminal 106 may not be collocated.

FIG. 3 shows a diagram of an embodiment of a rule engine and an embodiment of a database each configured for use in the system of FIG. 1 to perform the method of FIG. 2 according to this disclosure. In particular, there is a diagram 300 schematically illustrating the rule engine 116.2 and the database 108 usable by the system 100. As shown in FIG. 3, there is a server hosting the rule engine 116.2 and the database 108. However, note that such configuration is not required and there may be one server hosting the rule engine 116.2 and another server hosting the database 108, where the rule engine 116.2 is enabled to interface with the database 108, as disclosed herein.

As described above, the rule engine 116.2 may store various metadata (e.g., descriptive, preservation, structural, provenance, definitional, administrative, computational transaction) and various business rules (e.g., authorization rules, workflow rules, messaging rules, standard compliance rules), which enable the rule engine 116.2 to enrich messages received from the conversion logic 114.2. For example, the rule engine 116.2 may receive a message (e.g., a communication) from the conversion logic 114.2, as disclosed herein, and enrich the message with at least some metadata (e.g., descriptive, preservation, structural, provenance, definitional, administrative, computational transaction) to transform (e.g., augment, supplement) the message. Then, the rule engine 116.2 may apply at least some business rules to the message, as transformed, where such application may involve querying the database 108, as needed.

As described above, the database 108 may have a schema (e.g., flat, hierarchical, network, relational, star, snowflake) according to which the database 108 stores its records. For example, in context of medical claim processing, the database 108 may have a set of tables (e.g., related to each other by a primary key) storing data (e.g., textual, structured, unstructured, descriptive) for configurations of patient profiles, a set of tables (e.g., related to each other by a primary key) storing data (e.g., textual, structured, unstructured, descriptive) for configurations of payor profiles, a set of tables (e.g., related to each other) storing data (e.g., textual, structured, unstructured, descriptive) for configurations of prescription profiles, a set of tables (e.g., related to each other by a primary key) storing data (e.g., textual, structured, unstructured, descriptive) for configurations of prescriber profiles, a set of tables (e.g., related to each other by a primary key) storing data (e.g., textual, structured, unstructured, descriptive) for configurations of product profiles, a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other) storing data (e.g., textual, structured, unstructured, descriptive) for configurations of place of profiles. At least two of these sets of tables may be related to each other (e.g., via a primary key).

As described above, the database 108 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network, a neutrino network, an optical network (e.g., Li-Fi, fiberoptics), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled persons know that various modifications, additions, substitutions and the like can be made without departing from the spirit of this disclosure. As such, these are considered to be within the scope of the disclosure, as defined in the following claims.

What is claimed is:

1. A system, comprising:
 a computing terminal hosting an end user application program;
 a first server hosting a routing application program;
 a second server hosting a conversion logic; and
 a third server hosting a rule engine having a set of rules and accessing a language model trained to output a help content responsive to a prompt submitted to the language model based on an input into the rule engine and an output from the rule engine responsive to the input, wherein (i) the end user application program generates a request associated with a profile in a first data format and sends the request to the routing application program to enable (ii) the routing application program receives the request and routes the request to the conversion logic, (iii) the conversion logic receives the request, converts the request into a communication in a second data format and sends the communication to the rule engine, (iv) the rule engine receives the communication, determines whether the communication is applicable to at least one rule of the set of the rules, and takes a first action based on the communication being applicable to the at least one rule and a second action based on the communication being inapplicable to the at least one rule, wherein the first action includes generating a first response to the communication containing an approval or a denial of the request, generating the prompt based on the input into the rule engine containing the communication and the output from the rule engine containing the first response to the communication containing the approval or the denial, submitting the prompt to the language model, receiving the help content output from the language model responsive to the prompt, generating a second response to the communication containing the first response to the communication containing the approval or the denial and the help content in the second data format, and sending the second response to the conversion logic, (v) the conversion logic receives the second response, generates a reply based on the second response in the first data format containing the approval or the denial and the help content, and sends the reply to the routing application program, and (vi) the routing application program routes the reply to the computing terminal responsive to the request.

2. The system of claim 1, wherein the help content includes a textual content.

3. The system of claim 2, wherein the textual content includes an unstructured text.

4. The system of claim 2, wherein the textual content includes a structured text.

5. The system of claim 1, wherein the help content includes an image content.

6. The system of claim 1, wherein the help content includes a sound content.

7. The system of claim 1, wherein the help content is generated in a human language (i) associated with the computing terminal or (ii) determined based on a language setting on the computing terminal or the end user application program.

8. The system of claim 7, wherein the request includes the language setting.

9. The system of claim 1, further comprising:
 a database accessible by the rule engine, wherein the database stores a history of requests predating the request submitted to the rule engine and associated with the profile, wherein the rule engine generates the prompt based on the history of requests.

10. The system of claim 9, wherein the help content is generated based on the history of requests on a per-request basis.

11. The system of claim 9, wherein the help content is generated based on the history of requests on a per-identifier basis.

12. The system of claim 11, wherein the per identifier basis is a per-person basis.

13. The system of claim 11, wherein the per identifier basis is a per-entity basis.

14. The system of claim 1, wherein the third server hosts the language model.

15. The system of claim 1, wherein the third server does not host the language model.

16. The system of claim 1, wherein the language model is a large language model.

17. The system of claim 1, wherein the language model is a small language model.

18. The system of claim 1, wherein the language model is a fine-tuned language model.

19. The system of claim 1, wherein the language model is an edge language model.

20. The system of claim 1, wherein the first response is in the second data format.

21. The system of claim 1, wherein the approval is a partial approval.

22. The system of claim 1, wherein the approval is a complete approval.

23. The system of claim 1, wherein the denial is a partial denial.

24. The system of claim 1, wherein the denial is a complete denial.

25. The system of claim 1, wherein the computing terminal includes a first computing terminal sending the request to the routing application program and a second computing terminal receiving the reply from the routing application program responsive to the request.

26. The system of claim 1, wherein the computing terminal is a single computing terminal.

27. A method, comprising:

hosting a rule engine on a first server where the rule engine has a set of rules and access to a language model trained to output a help content responsive to a prompt submitted to the language model based on an input into the rule engine and an output from the rule engine responsive to the input to enable (i) an end user application program hosted on a computing terminal generates a request associated with a profile in a first data format and sends the request to a conversion logic hosted on a second server to enable (ii) the conversion logic receives the request, converts the request into a communication in a second data format and sends the communication to the rule engine to enable (iii) the rule engine receives the communication, determines whether the communication is applicable to at least one rule of the set of the rules, and takes a first action based on the communication being applicable to the at least one rule and a second action based on the communication being inapplicable to the at least one rule, wherein the first action includes generating a first response to the communication containing an approval or a denial of the request, generating the prompt based on the input into the rule engine containing the communication and the output from the rule engine containing the first response to the communication containing the approval or the denial, submitting the prompt to the language model, receiving the help content output from the language model responsive to the prompt, generating a second response to the communication containing the first response to the communication containing the approval or the denial and the help content in the second data format, and sending the second response to the conversion logic to enable (iv) the conversion logic receives the second response, generates a reply based on the second response in the first data format containing the approval or the denial and the help content, and sends the reply to the computing terminal responsive to the request.

* * * * *